United States Patent [19]
Ouchi et al.

[11] Patent Number: 4,841,808
[45] Date of Patent: Jun. 27, 1989

[54] DIFFERENTIAL CONTROL DEVICE

[75] Inventors: Mitsuyuki Ouchi; Kouichi Aono, both of Susono, Japan

[73] Assignee: Toyota Jidosha Kabushiki Kaisha, Aichi, Japan

[21] Appl. No.: 156,574

[22] Filed: Feb. 17, 1988

[30] Foreign Application Priority Data

Mar. 23, 1987 [JP] Japan .................................. 62-65842

[51] Int. Cl.[4] ......................... F16H 1/44; B60K 17/35
[52] U.S. Cl. ..................................... 74/710.5; 74/711; 180/249
[58] Field of Search ...................... 74/710.5, 711, 650, 74/665 T; 180/248, 249

[56] References Cited

U.S. PATENT DOCUMENTS

| | | | |
|---|---|---|---|
| 4,566,554 | 1/1986 | Suzuki | 180/247 X |
| 4,669,569 | 6/1987 | Suzuki et al. | 74/710.5 X |
| 4,681,180 | 7/1987 | Oyama et al. | 74/650 X |
| 4,681,185 | 7/1987 | Hoernig et al. | 180/247 |
| 4,699,236 | 10/1987 | Morisawa et al. | 180/249 |
| 4,727,954 | 3/1988 | Matsumoto | 180/249 |

FOREIGN PATENT DOCUMENTS

| | | | |
|---|---|---|---|
| 0247820 | 12/1987 | European Pat. Off. | 74/711 |
| 60-132928 | 5/1985 | Japan . | |
| 61-67629 | 4/1986 | Japan . | |
| 61-132420 | 6/1986 | Japan . | |
| 62-99213 | 5/1987 | Japan | 180/248 |
| 62-214019 | 9/1987 | Japan | 180/248 |

Primary Examiner—Dirk Wright
Assistant Examiner—Christopher C. Campbell
Attorney, Agent, or Firm—Oliff & Berridge

[57] ABSTRACT

A differential control device for controlling the differential of a differential gear having a differential limiting mechanism includes a sensor for detecting a steering angle, a sensor for detecting a vehicle speed, a controller for receiving signals from the steering angle detecting sensor and vehicle speed detecting sensor and an actuator for operating the differential limiting mechanism. A reference steering angle corresponding to a vehicle speed is set in the controller, and the controller controls the actuator on the basis of the reference steering angle.

14 Claims, 6 Drawing Sheets

FIG. I

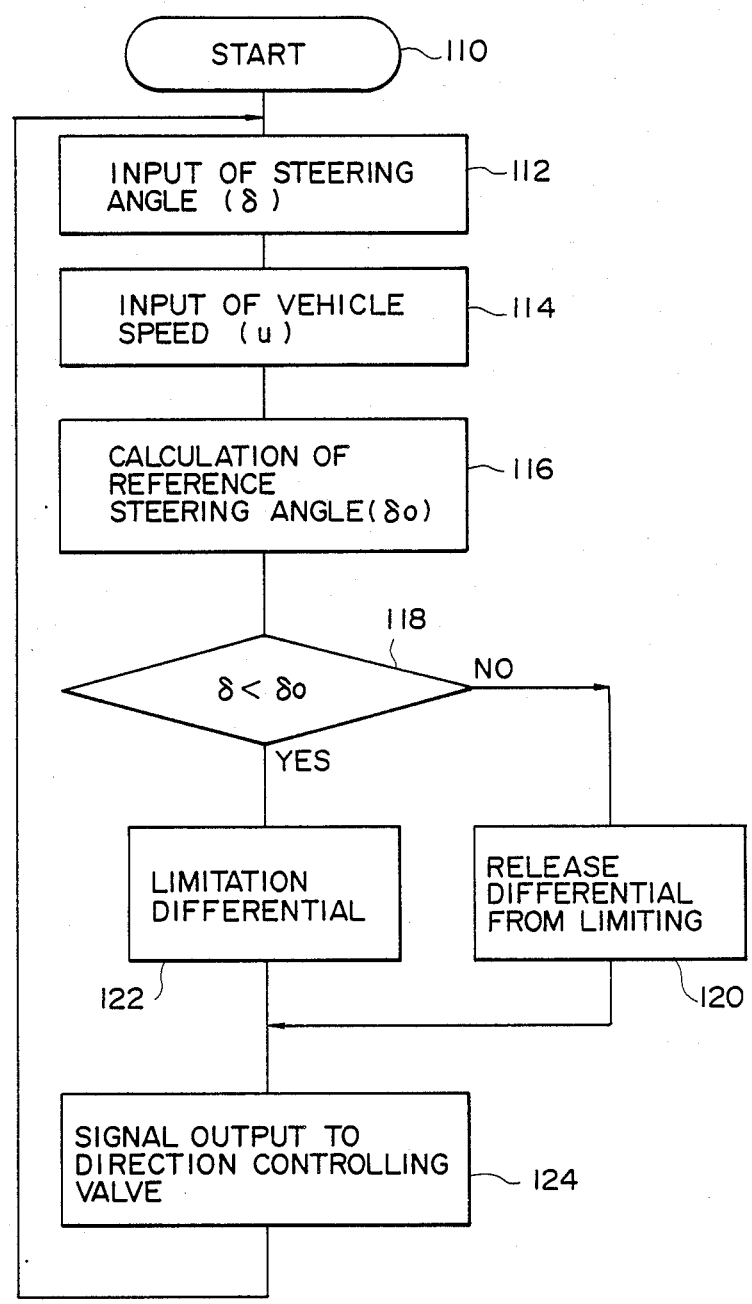

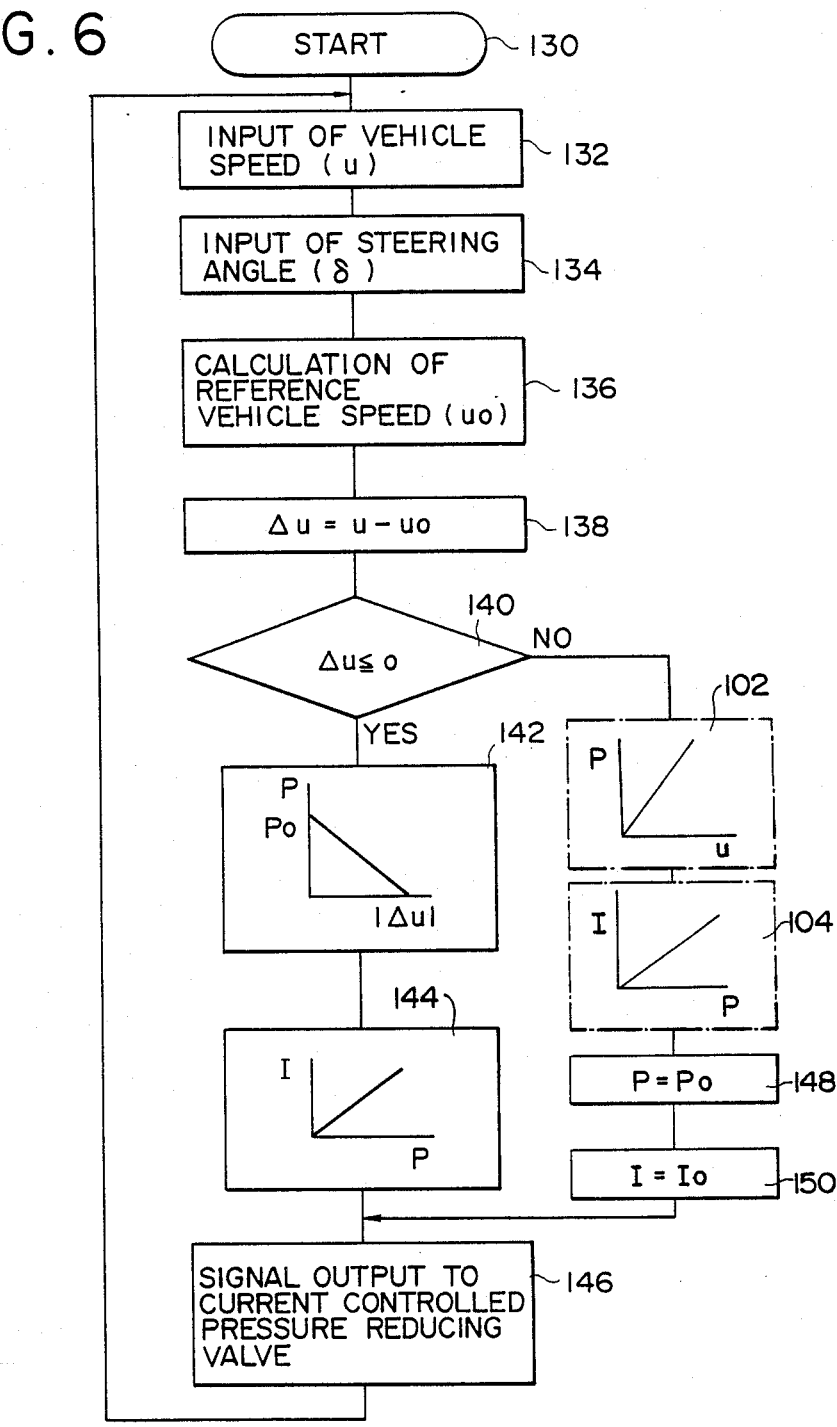

DIFFERENTIAL CONTROL DEVICE

BACKGROUND OF THE INVENTION

1. Field of the Invention

This invention relates to a differential control device and, more particularly, to a device for controlling the differential of a differential gear provided with a differential limiting mechanism and disposed on a vehicle.

2. Description of Related Art

A limited slip differential or differential gear capable of limiting the differential is provided with, in addition to a usual differential mechanism, a differential limiting mechanism including a plurality of friction disks, a hydraulic device for operating these friction disks and the like, thereby limiting the differential produced in the differential mechanism by the contact of the frictional disks. Thus, controllability is improved by limiting the differential when a vehicle speed exceeds a predetermined reference value (for example, Japanese Patent Public Disclosure (KOKAI) No. 60-237242). Further, both the turning ability and the controllability may be attained by releasing the differential from limitation when a turning angle exceeds a predetermined reference value (for example, Japanese Utility Model Public Disclosure (KOKAI) No. 59-150630, and No. 57-118936 and Japanese Patent Application Publication No. 45-24087).

SUMMARY OF THE INVENTION

According to the prior art, in which the differential is limited when the vehicle speed exceeds the reference value, since the reference value is constant irrespective of a steering angle, the turning ability is damaged with an excessively high reference value and, on the contrary, traction in turning can not be sufficiently ensured with a excessively low reference value.

Also, in the prior art, the differential is released from limitation when the turning angle exceeds the reference value. Since the reference value is constant irrespective of the vehicle speed, the vehicle is liable to deflect as the vehicle speed is increased when the reference value is set to cope with the case when a vehicle travels on a road with necessary acceleration immediately after traveling along curve, and the traction can be ensured by maintaining the differential limiting condition. This is because driving force in a rear-wheel-drive car, for example, is increased when the vehicle speed is increased in turning, so that the rear wheel is liable to spin, thus resulting in reduction of cornering force of the rear wheel.

An object of the present invention is to provide a differential control device which can further improve both the turning ability and straight line stability by changing a reference value according to a steering angle or a vehicle speed.

According to the present invention, there is provided a device which controls the differential of a differential gear having a differential limiting mechanism and comprises means for detecting a steering angle, means for detecting a vehicle speed, a controller for receiving signals from the steering angle detecting means and vehicle speed detecting means and having a reference steering angle set according to the vehicle speed and means for operating the differential limiting mechanism, wherein the controller controls the operating means on the basis of the reference steering angle.

The controller in one aspect of the invention obtains from a detected vehicle speed a reference steering angle corresponding to the vehicle speed and compares a detected steering angle with the reference steering angle, thereby controlling the operating means so as to limit the differential when the detected steering angle is smaller than the reference steering angle.

The controller in another aspect obtains from a detected vehicle speed a reference steering angle corresponding to the vehicle speed and compares a detected steering angle with the reference steering angle, thereby controlling the operating means so as to limit the differential when the detected steering angle is smaller than the reference steering angle and cause the differential gear to receive a differential limiting amount which is successively reduced as a difference between the detected steering angle and the reference steering angle is increased when the detected steering angle is not smaller than the reference steering angle.

According to the present invention, there is further provided a device which controls the differential of a differential gear having a differential limiting mechanism and comprises means for detecting a steering angle, means for detecting a vehicle speed, a controller for receiving signals from the steering angle detecting means and vehicle speed detecting means and having a reference vehicle speed set corresponding to the steering angle and means for operating the differential limiting mechanism, wherein the controller controls the operating means on the basis of the reference vehicle speed.

The controller in one aspect of the invention obtains from a detected steering angle a reference vehicle speed corresponding to the steering angle and compares a detected vehicle speed with the reference vehicle speed, thereby controlling the operating means so as to limit the differential when the detected vehicle speed exceeds the reference vehicle speed.

The controller in another aspect obtains from a detected steering angle a reference vehicle speed corresponding to the steering angle and compares a detected vehicle speed with the reference vehicle speed, thereby controlling the operating means so as to limit the differential when the detected vehicle speed exceeds the reference vehicle speed and cause the differential gear to receive a differential limiting amount which is successively reduced as a difference between the detected vehicle speed and the reference vehicle speed is increased when the detected vehicle speed is not higher than the reference vehicle speed.

In the event that the reference steering angle is obtained from the detected vehicle speed, when the detected steering angle is smaller than the reference steering angle, the differential is absolutely limited. In this case, control of primarily turning can be done by determining the reference steering angle to be reduced as the vehicle speed is increased and, on the contrary, control of primarily traction can be done by determining the reference steering angle to be increased as the vehicle speed is increased.

When the detected steering angle is not smaller than the reference steering angle, the differential may be limited at will. Thereby, both the turning ability and traction property can be attained more securely.

In the event that the reference vehicle speed is obtained from the detected steering angle, when the detected vehicle speed exceeds the reference vehicle speed, the differential is absolutely limited. The reference vehicle speed is determined to be increased as the steering angle is increased, so that both the turning ability and the traction property can be ensured.

When the detected vehicle speed is not higher than the reference vehicle speed, the differential may be limited at will. Thereby, both the turning ability and the traction property can be attained more securely.

Since the reference value is changed according to the vehicle speed or steering angle and the detected value is compared with the changed reference value to limit the differential or release from limitation, the turning ability and straight line stability can be improved over a wide range of the vehicle speed or of the steering angle.

BRIEF DESCRIPTION OF THE DRAWINGS

The foregoing and other objects and features of the invention will become apparent from the following description of preferred embodiments of the invention with reference to the accompanying drawings, in which:

FIGS. 4 to 6 are flow charts showing the operation of control, respectively.

DESCRIPTION OF THE PREFERRED EMBODIMENTS

Figure 1:
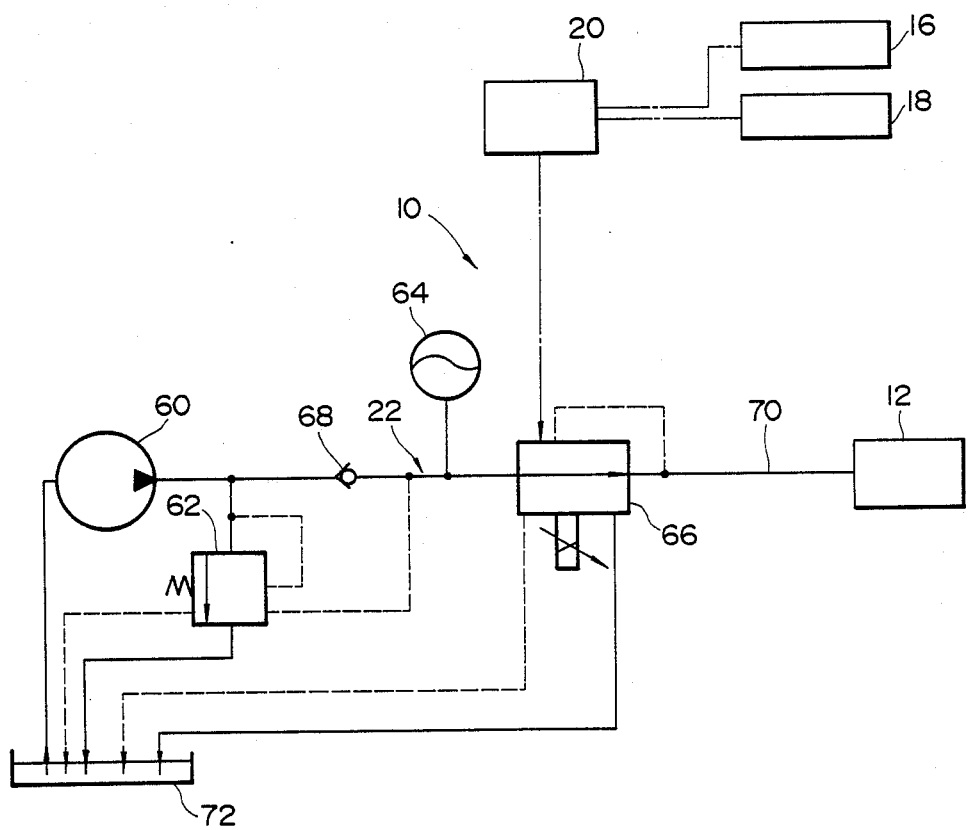
FIG. 1 is a block diagram showing a differential control device.
Figure 2:
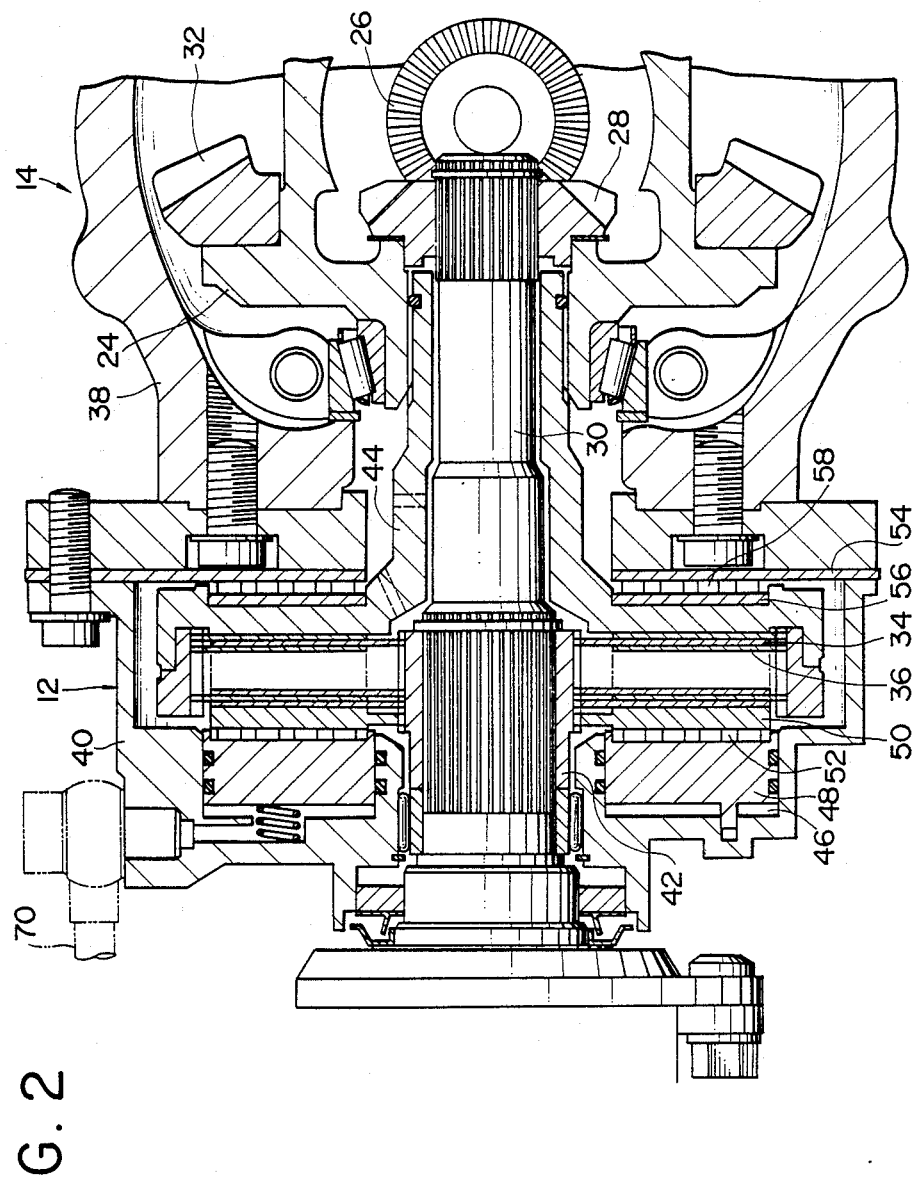
FIG. 2 is a sectional view showing a differential gear.

As shown in FIGS. 1 and 2, a differential control device 10 controls the differential of a differential gear 14 having a differential limiting mechanism 12 and comprises means 16 for detecting a steering angle, means 18 for detecting a vehicle speed, a controller 20 and operating means 22.

Any differential gears can be used so long as they are provided with a differential limiting mechanism. The differential gear 14 shown in FIG. 2 is constituted from a differential case 24, a plurality of pinions 26 and a pair of side gears 28 which are disposed respectively in the differential case 24 (each one of these pinions and side gears is shown in FIG. 2) and a shaft 30 connected to each side gear 28. A drive pinion (not shown) meshes with a ring gear 32 to transmit driving force.

The differential limiting mechanism 12 limits the differential of the differential gear 14 and is provided with a plurality of first friction disks 34 rotatable with one side gear 28 and a plurality of second friction disks 36 rotatable with the differential case 24. A first differential carrier 38 is fixedly disposed to surround and support rotatably the differential case 24. A second differential carrier 40 is mounted on the first differential carrier 38.

A cylindrical spacer 42 is fixedly mounted on the shaft 30, and the first friction disks 34 are supported unrotatably, but axially movably by the spacer 42. On the other hand, a tubular transmitting member 44 connected unrotatably with the differential case 24 is disposed to surround the shaft 30. The diameter of the transmitting member 44 is expanded at a portion clearing the first differential carrier 38, and the second friction disks 36 are supported unrotatably, but axially movably in the expanded diameter portion. The first and second friction disks 34, 36 are disposed alternatively to each other. The second differential carrier 40 surrounds the expanded diameter portion of the transmitting member 44.

A piston chamber 46 is provided in the second differential carrier 40, and a first piston 48 is disposed movably, but unrotatably in the piston chamber 46. A second piston 50 is disposed spacedly apart from the first piston 48 to be supported unrotatably, but axially movably by the spacer 42. A thrust bearing 52 is disposed between the first and second pistons 48, 50.

When hydraulic pressure is introduced from the outside into the piston chamber 46, the first piston 48 is pressed against the second piston 50 through the thrust bearing 52, so that frictional force proportional to the pressure is produced between the first and second friction disks 34, 36. The differential of the differential gear 14 is limited by this frictional force. At this time, a reaction produced in the transmitting member 44 is transmitted to a thrust washer 54 disposed between the differential carriers 38, 40, a thrust washer 56 disposed on the transmitting member 44 and a thrust bearing 58 disposed between both washers to be received by the differential carrier 38.

The means 16 for detecting the steering angle is a potentiometer or other detectors and the means 18 for detecting the vehicle speed is a tachometer or other detectors.

Figure 3A:
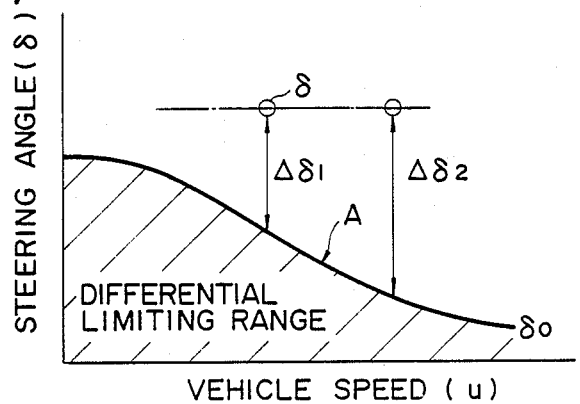
FIGS. 3a and 3b are graphs showing the correlation between a vehicle speed and a reference steering angle which are memorized as a map.
Figure 3B:
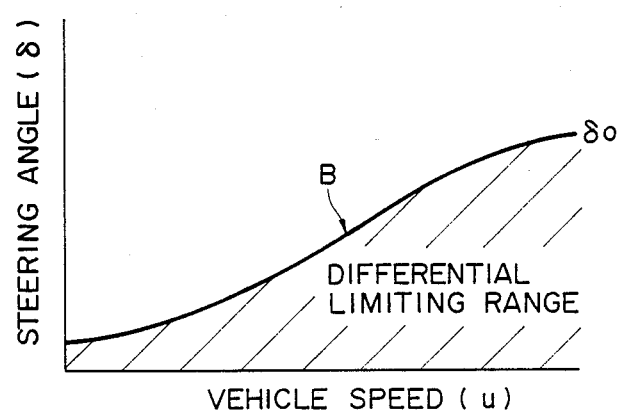
Figure 3C:
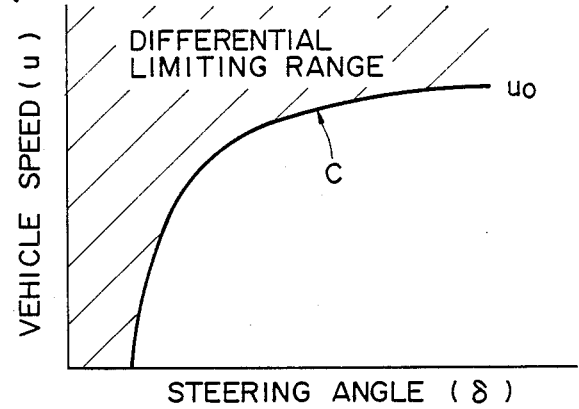
FIG. 3c is a graph showing the correlation between a steering angle and a reference vehicle speed which are memorized as a map.

The controller 20 is a CPU or computer which receives signals from the steering angle detecting means 16 and vehicle speed detecting means 18. In the controller 20, as shown in FIGS. 3a to 3c, are memorized as maps a graph A or B showing the correlation between a vehicle speed u and a reference steering angle $\delta_o$ and a graph C showing the correlation between a steering angle $\delta$ and a reference vehicle speed $u_o$.

The graph A is plotted such that the reference steering angle $\delta_o$ is reduced as the vehicle speed u is increased, and is used in the case of considering primarily the turning ability. Also, the graph B is plotted such that the reference steering angle $\delta_o$ is increased as the vehicle speed u is increased, and is used in the case of considering primarily the traction. The graph C is plotted such that the reference vehicle speed $u_o$ is increased as the steering angle $\delta$ is increased. These graphs are empirically or experimentally obtained. A command as to which graph is to be used in the control of the controller 20, which will be later described, is selected by a driver and given to the controller 20. Alternatively, only one graph may be specified for every type of vehicle.

The operating means 22 is provided with a hydraulic pump 60, an unload relief valve 62, an accumulator 64, a current controlled pressure-reducing valve 66 and a check valve 68.

A pipe 70 extends from the pump 60 to the differential limiting mechanism 12 to communicate with the piston chamber 46. The unload relief valve 62 is incorporated in the pipe 70, and the current controlled pressure-reducing valve 66 is incorporated in a portion extending from the unload relief valve 62 to the differential limiting mechanism 12. Further, the accumulator 64 is connected between the unload relief valve 62 and the current controlled pressure-reducing valve 66, and the check valve 68 is incorporated between the unload relief valve 62 and the accumulator 64. The check valve 68 merely allows fluid to flow or pressure to be transmitted from the unload relief valve 62 toward the accumulator 64.

When pressurized liquid is supplied from the pump 60, an unload seat of the unload relief valve 62 is closed and the check valve 68 is opened. As a result, the pressurized liquid from the pump 60 is introduced into the accumulator 64 through the pipe 70 to increase hydraulic pressure therein. When the pressure in the accumulator 64 reaches a regulating pressure of the unload relief valve 62, the unload relief valve 62 is instantly opened, so that the pressurized liquid from the pump 60 returns to a reservoir tank 72, and the check valve 68 closes. Thus, a constant pressure is stored in the accumulator 64.

The current controlled pressure-reducing valve 66 which is provided in a pilot section with a DC solenoid outputs pressure continuously and infinitely variably by controlling the input current to the solenoid. The pressure delivered from the valve is substantially proportional to the input current. Thus, current applied to the current controlled pressure-reducing valve 66 is controlled by the controller 20 to obtain the proper pressure.

Figure 4:
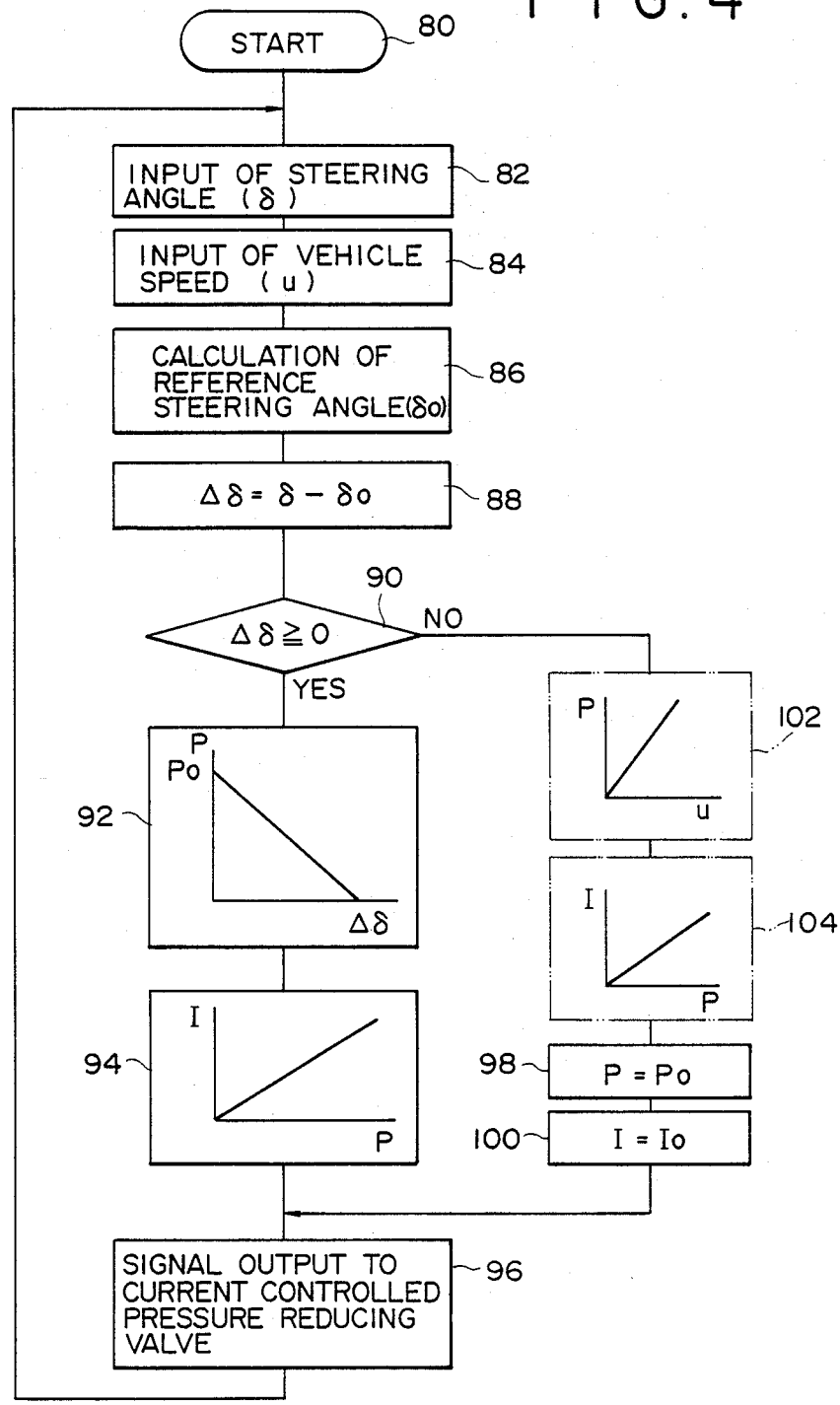

Assuming that the driver selects the control of the graph A, the controller 20 makes a decision as shown in FIG. 4, for example, to control the operating means 22. After the initialization (80), a steering angle $\delta$ is inputted (82) and a vehicle speed u is inputted (84). Then, from the map shown in FIG. 3a is obtained a reference steering angle $\delta_o$ corresponding to the vehicle speed u (86).

After obtaining the reference steering angle $\delta_o$, a difference angle $\Delta\delta$ is calculated (88) by subtracting the reference steering angle $\delta_o$ from the detected steering angle $\delta$. Whether the difference angle $\delta\Delta$ is positive or negative is judged (90). The controller 20 releases the differential gear 14 from the limitation of differential in the case that the differential limiting mechanism 12 is controlled by a conventional directional control valve, when the difference is not negative, i.e., the detected steering angle $\delta$ is not smaller than the reference steering angle $\delta_o$.

In this case since the operating means 22 is provided with the current controlled pressure-reducing valve 66, the controller 20 gives any limitation of differential to the differential limiting mechanism 12 when the detected steering angle $\delta$ is not smaller than the reference steering angle $\Delta\delta$. Namely, the controller 20 gives the differential limiting amount corresponding to the difference angle $\Delta\delta$ to the differential gear 14 to ensure the turning ability and traction property.

A graph, in which the pressure P to be applied to the differential limiting mechanism 12 is reduced linearly as the difference angle $\Delta\delta$ is increased, is formed and previously stored in the controller 20 as a map. This map is obtained experimentally or empirically. First, the pressure P corresponding to the difference angle $\Delta\delta$ is obtained (92) from the map and then, current I is obtained (94) from a map to output the pressure P from the current controlled pressure-reducing valve 66.

The controller 20 generates an output to give (96) the current I to the current controlled pressure-reducing valve 66. As a result, the pressure P is supplied to the differential limiting mechanism 12, so that the frictional force corresponding to the pressure P is produced on the friction disks 34,36 of the differential limiting mechanism to limit the differential.

When the difference angle $\Delta\delta$ is negative, i.e., the detected steering angle $\delta$ is smaller than the reference steering angle $\delta_o$, the controller 20 sets (98,100) the pressure P to a certain value $P_o$ and the current I to a certain value $I_o$, irrespective of the size of the detected steering angle. Thereafter, the current $I_o$ is outputted (96) to be supplied to the current controlled pressure-reducing valve 66. Thus, a constant differential limiting amount is always given to the differential limiting mechanism 12.

When the difference angle $\Delta\delta$ is negative, the differential limiting amount may be controlled by a vehicle speed. As shown by the phantom lines in FIG. 4, a graph, in which the pressure P is increased proportionally to the increase of the vehicle speed u, is formed and stored as a map in the controller 20. The controller 20 obtains (102) the pressure P from the detected vehicle speed u and obtains (104) the current I to output the pressure P. Then, the current I is supplied (96) to the current controlled pressure-reducing valve 66.

According to the above-mentioned embodiment, the following effect can be obtained. As shown in FIG. 3a, when the vehicle speed u increases even if the detected steering angle $\delta$ is constant, the difference angle $\delta\Delta$ is increasingly changed from $\Delta\delta_1$ to $\Delta\delta_2$ and the pressure P to be applied to the differential limiting mechanism 12 is reduced as the difference angle $\Delta\delta$ is increased, as apparent from the map (refer to 92). Therefore, the differential limiting amount which is reduced as the vehicle speed is increased can be given to improve the turning ability.

As shown in FIG. 5, when the differential is controlled in the so-called ON/OFF manner, i.e., the differential is limited or released from the limitation, a change-over valve or directional control valve known per se, may be used instead of the current controlled pressure-reducing valve 66 of the operating means 22.

After the initialization (110), the steering angle $\delta$ is inputted (112) and the vehicle speed u is inputted (114). And the reference steering angle $\delta_o$ corresponding to the vehicle speed u is obtained (116) from the map shown in FIG. 3a or 3b. After the reference steering angle $\delta_o$ is obtained, the detected steering angle $\delta$ is compared (118) with the reference steering angle $\delta_o$. When the detected steering angle $\delta$ is not smaller than the reference steering angle $\delta_o$, the differential is determined to be released (120) from the limitation, and when the detected steering angle $\delta$ is smaller than the reference steering angle $\delta_o$, the differential is determined to be limited (122) and the directional control valve is operated (124).

When the driver selects the control of the graph C in FIG. 3, the controller 20 judges as shown in FIG. 6 to control the operating means 22. After the initialization (130), the vehicle speed u is inputted (132) and the steering angle $\delta$ is inputted (134). And from the map shown in FIG. 3c is obtained (136) the reference vehicle speed $u_o$ corresponding to the steering angle $\delta$.

After the reference vehicle speed $u_o$ is obtained, a difference speed $\Delta u$ is calculated (138) by subtracting the reference vehicle speed $u_o$ from the detected vehicle speed u. Whether the difference speed $\Delta u$ is positive or negative is judged (140). When the difference speed is not positive, i.e., the detected vehicle speed u is not higher than the reference vehicle speed $u_o$, the controller 20 releases the differential gear 14 from the limitation of the differential.

In the case of the embodiment, since the operating means 22 is provided with the current controlled pressure-reducing valve 66, the controller 20 gives any limitation of the differential to the differential limiting mechanism 12 when the detected vehicle speed u is not higher than the reference vehicle speed $u_o$. That is, the limiting amount corresponding to an absolute value of the difference speed $\Delta u$ is given to the differential gear 14 to ensure the turning ability and traction property.

A graph, in which the pressure P to be applied to the differential limiting mechanism 12 is linearly reduced as the absolute value of the difference speed $\Delta u$ is increased, is formed and previously stored as a map in the controller 20. This map is obtained experimentally or empirically. First, the pressure P corresponding to the absolute value of the difference speed $\Delta u$ is obtained (142) from the map and then the current I is obtained (144) to output the pressure P from the map. And the controller 20 generates (146) the current I to be applied to the current controlled pressure-reducing valve 66. As a result, the pressure P is supplied to the differential limiting mechanism 12 to produce the frictional force corresponding to the pressure P on the friction disks 34,36 of the differential limiting mechanism and then limit the differential.

When the difference speed $\Delta u$ is positive, i.e., the detected vehicle speed u is higher than the reference vehicle speed $u_o$, the controller 20, irrespective of the size of the detected steering angle, sets (148, 150) the pressure P to a constant value $P_o$ and the current I to a constant value $I_o$ to generate (146) the current $I_o$ to be applied to the current controlled pressure-reducing valve 66. Thus, a constant differential limiting amount is always given to the differential limiting mechanism 12.

When the difference speed $\Delta u$ is positive, the differential limiting amount may be controlled by a vehicle speed in a manner similar to steps 98, 100, 102 and 104 of the flow chart in FIG 4. A graph, in which the pressure P is increased proportionally to the increase of the vehicle speed u, is formed and stored as a map like that of the previously mentioned embodiment in the controller 20 (see step 102 in FIG. 4). The controller 20 obtains the pressure P from the detected vehicle speed $\Delta u$ when the difference speed u is positive and obtains the current I to output the pressure P so that the current may be supplied to the current controlled pressure-reducing valve 66.

In this embodiment, the ON/OFF control can be carried out according to FIG. 5.

What is claimed is:

1. A differential control device for controlling a differential of a differential gear having a differential limiting mechanism, comprising:
   means for detecting a steering angle;
   means for detecting a vehicle speed;
   a controller for receiving signals from said steering angle detecting means and vehicle speed detecting means in which is stored as a map a reference steering angle which is changed in accordance with changes in vehicle speed; and
   means for operating said differential limiting mechanism,
   wherein said controller controls said operating means on the basis of said reference steering angle.

2. A differential control device for controlling a differential of a differential gear having a differential limiting mechanism, comprising:
   means for detecting a steering angle;
   means for detecting a vehicle speed;
   a controller for receiving signals from said steering angle detecting means and vehicle speed detecting means in which is stored as a map a reference steering angle which is changed in accordance with changes in vehicle speed, the controller obtaining from a detected vehicle speed the reference steering angle corresponding to the vehicle speed and comparing a detected steering angle with said reference steering angle; and
   means for operating said differential limiting mechanism,
   wherein the controller controls said operating means so as to limit the differential when the detected steering angle is smaller than said reference steering angle.

3. A differential control device as claimed in claim 2, wherein said reference steering angle is obtained from the map which is plotted such that the reference steering angle is reduced as the vehicle speed increases.

4. A differential control device as claimed in claim 2, wherein said reference steering angle is obtained from the map which is plotted such that the reference steering angle is increased as the vehicle speed increases.

5. A differential control device as claimed in claim 2, wherein said controller controls said operating means so as to give the differential limiting mechanism a differential limiting amount which is reduced as a difference between the detected steering angle and the reference steering angle increases when the detected steering angle is not smaller than the reference steering angle.

6. A differential control device as claimed in claim 2, wherein said controller controls said operating means so as to release the differential from limiting when the detected steering angle is not smaller than the reference steering angle.

7. A differential control device for controlling a differential of a differential gear having a differential limiting mechanism, comprising:
   means for detecting a steering angle;
   means for detecting a vehicle speed;
   a controller for receiving signals from said steering angle detecting means and vehicle speed detecting means in which is stored as a map a reference steering angle which is changed in accordance with changes in vehicle speed, the controller obtaining from a detected vehicle speed the reference steering angle corresponding to the vehicle speed and comparing a detected steering angle with said reference steering angle; and
   means for operating said differential limiting mechanism;
   wherein said controller controls said operating means so as to give the differential limiting mechanism a differential limiting amount which is increased as the vehicle speed increases when the detected steering angle is smaller than said reference steering angle, and wherein said controller controls said operating means so as to give to the differential limiting mechanism a differential limiting amount which is reduced as a difference between the detected steering angle and the reference steering angle increases when the detected steering angle is not smaller than the reference steering angle.

8. A differential control device for controlling a differential of a differential gear having a differential limiting mechanism, comprising:
   means for detecting a steering angle;
   means for detecting a vehicle speed;
   a controller for receiving signals from said steering angle detecting means and vehicle speed detecting means in which is stored as a map a reference vehicle speed which is changed in accordance with changes in steering angle; and means for operating said differential limiting mechanism;

wherein said controller controls said operating means on the basis of said reference vehicle speed.

9. A differential control device for controlling a differential of a differential gear having a differential limiting mechanism, comprising:

means for detecting a steering angle;

means for detecting a vehicle speed;

a controller for receiving signals from said steering angle detecting means and vehicle speed detecting means in which is stored as a map a reference vehicle speed which is changed in accordance with changes in steering angle, the controller obtaining from a detected steering angle the reference vehicle speed corresponding to the steering angle and comparing a detected vehicle speed with said reference vehicle speed; and means for operating said differential limiting mechanism;

wherein the controller controls said operating means so as to limit the differential when the detected vehicle speed is larger than said reference vehicle speed.

10. A differential control device as claimed in claim 9, wherein said reference vehicle speed is obtained from the map which is plotted such that the reference vehicle speed is increased as the steering angle increases.

11. A differential control device as claimed in claim 9, wherein said controller controls said operating means so as to give the differential limiting mechanism a differential limiting amount which is reduced as an absolute value of a difference between the detected vehicle speed and the reference vehicle speed increases when the detected vehicle speed is not larger than the reference vehicle speed.

12. A differential control device as claimed in claim 9, wherein said controller controls said operating means so as to release the differential from limiting when the detected vehicle speed is not larger than the reference vehicle speed.

13. A differential control device for controlling a differential of a differential gear having a differential limiting mechanism, comprising:

means for detecting a steering angle;

means for detecting a vehicle speed;

a controller for receiving signals from said steering angle detecting means and vehicle speed detecting means in which is stored as a map a reference vehicle speed which is changed in accordance with changes in steering angle, the controller obtaining from a detected steering angle the reference vehicle speed corresponding to the steering angle and comparing a detected vehicle speed with said reference vehicle speed; and means for operating said differential limiting mechanism, wherein said controller controls said operating means so as to give the differential limiting mechanism a differential limiting amount which is increased as the vehicle speed increases when the detected vehicle speed is larger than said reference vehicle speed, and wherein said controller controls said operating means so as to give the differential limiting mechanism a differential limiting amount which is reduced as an absolute value of a difference between the detected vehicle speed and the reference vehicle speed increases when the detected vehicle speed is not larger than the reference vehicle speed.

14. A differential control device for controlling a differential of a differential gear having a differential limiting mechanism, comprising:

means for detecting a steering angle;

means for detecting a vehicle speed;

a controller for receiving signals from said steering angle detecting means and vehicle speed detecting means in which is stored as a map of graphs reference steering angles each changing as vehicle speed changes; and means for operating said differential limiting mechanism;

wherein a command as to which graph is to be used in the control of the controller is selected external of the controller and given to the controller, and wherein said controller controls said operating means on the basis of said reference steering angle.

* * * * *